Nov. 30, 1965  R. VON HUENE  3,220,300

SPECIMEN HOLDER

Filed June 9, 1961

INVENTOR.
RUDOLPH VON HUENE
BY Lyon & Lyon
ATTORNEYS

United States Patent Office 3,220,300
Patented Nov. 30, 1965

3,220,300
SPECIMEN HOLDER
Rudolph von Huene, Pasadena, Calif., assignor to California Institute Research Foundation, a corporation of California
Filed June 9, 1961, Ser. No. 116,128
2 Claims. (Cl. 88—14)

This invention relates to specimen holders and included in the objects of this invention are:

First, to provide a specimen holder which utilizes a pair of dished glasses commonly termed "watch glasses" which are held with their rims in mutual bearing contact by a yieldable retainer ring of plastic material.

Second, to provide a specimen holder of this class wherein the retainer ring is provided with a relatively thick lower supporting lip and a relatively thin, flexible upper lip so that dished watch glasses, especially the uppermost glass may be readily fitted within the retainer ring when desired but is dependably held thereby against accidental dislodgement.

Third, to provide a specimen holder of this class wherein the upper retainer lip is bordered by a rim adapted for manual engagement to force the lip clear of the watch glasses to facilitate insertion or removal thereof.

Fourth, to provide a specimen holder of this class wherein the retainer ring is provided with supporting feet to dispose the watch glasses in spaced relation to an undersurface, the legs being so arranged as to fit within the rim at the upper side of the retainer rim so that a series of the specimen holders may be stacked.

With the above and other objects in view as may appear hereinafter, reference is directed to the accompanying drawings in which.

Figure 1:
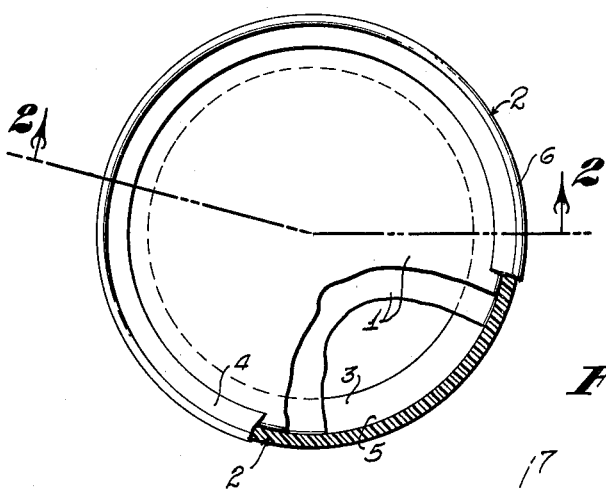
FIGURE 1 is a top view of the specimen holder with portions broken away to illustrate its construction.

The specimen holder is adapted to utilize a pair of dished glasses 1 which are known commercially as watch glasses. The glasses are essentially segments of a spherical surface and when placed rim to rim form a lens-shaped cavity or chamber.

The watch glasses 1 are held by a retainer ring 2 formed of an elastomer preferably plastic, such as polyethylene, polysiloxane, chlorobutadiene polymer, polyvinyl chloride, chloroprene, or plastic materials having similar properties.

The retainer ring includes a lower or major lip 3 and an upper or minor lip 4 which define therebetween an annular channel 5. While both lips are flexible, the lower lip is somewhat thicker in cross section and therefore less flexible or distortionable than the upper lip.

Figure 2:
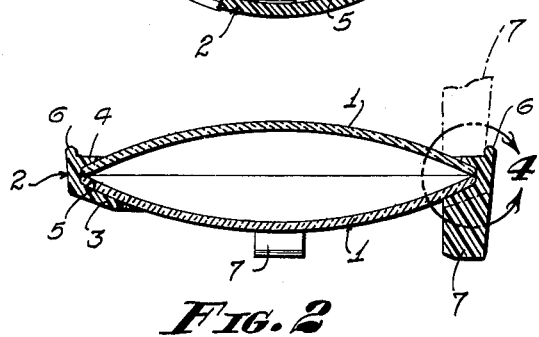
FIGURE 2 is a transverse, sectional view thereof taken through 2—2 of FIGURE 1.
Figure 4:
FIGURE 4 is an enlarged fragmentary, sectional view taken within the circle 4 of FIGURE 2 showing the manner in which the upper retainer lip is disorted for insertion and removal of one or both of the glass members.
Figure 3:
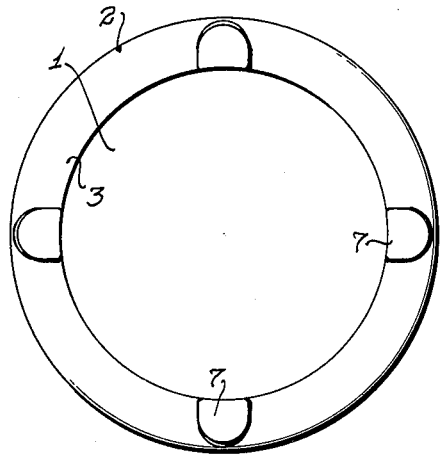
FIGURE 3 is a bottom view of the specimen holder.

The dished glasses or watch glasses fit within the channel 5 between the lips 3 and 4 as shown best in FIGURE 2. The retainer ring is provided with an upwardly extending marginal rim 6 surrounding the upper lip 4. The marginal rim is adapted to be manually engaged in the direction of the arrow indicated in FIGURE 4 to distort the upper or minor lip 4 so that the watch glasses may be inserted or removed or the upper watch glass removed from the lower watch glass.

The lower or major lip 3 is provided with downwardly extended supporting lugs 7. Three, four or more of these lugs may be provided. The lugs taper inwardly slightly so that the lugs of one specimen holder may fit within the marginal rim 6 of a lower specimen holder as indicated by broken lines in FIGURE 2. This enables a series of specimen holders to be stacked.

Figure 5:
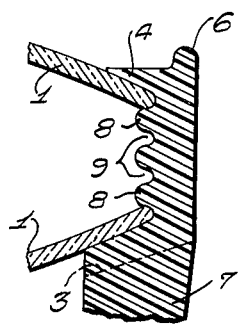
FIGURE 5 is a fragmentary, sectional view similar to FIGURE 4 showing a modified retainer in which the channel is provided with several internal flanges.

Reference is directed to FIG. 5. This construction differs from the previously described structure in that the channel 5 is axially extended and one or more internal flanges 8 are provided to form individual channels 9 for the rims or margins of the dished glasses or plates 1. The internal flanges as well as the surrounding wall of the retainer are distortable for insertion and removal of the plate members 1.

While the term "glasses" has been used in designating the dished members 1, the material may, in fact, be a plastic material and may or may not be transparent. While it is preferred to utilize dished shaped members, it should be noted that one of the members may be flat or if the construction shown in FIG. 5 is used, both members may be flat.

Having thus described certain embodiments and applications of my invention, I do not desire to be limited thereto, but intend to claim all novelty inherent in the appended claims.

I claim:

1. A retainer means for a pair of watch glass type specimen holders disposed with their peripheries in confronting relation, whereby one of said holders forms a dish and the other forms a cover therefor, said retainer means comprising:

(a) a relatively thick and wide, and therefor relatively stiff lower lip adapted to conform to and support the periphery of said dish;
    (b) a relatively thin and narrow, and therefor relatively flexible upper lip joined to the lower lip to define therewith an annular channel to secure the peripheries of said dish and cover, said upper lip adapted to conform to and fit over the periphery of said cover, and being readily distortable, for ready insertion and removal of said cover without disturbing said dish;
    (c) a circular rim extending axially from the outer margin of said upper lip, said rim being manually engageable to assist in distorting said upper lip;
    (d) and integral supporting members etxending downwardly from said lower lip and defining a circle of less diameter than the circle defined by said rim, whereby a series of said retainer means and the specimen holders therein may be stacked.

2. A retainer means as set forth in claim 1, wherein:
    (a) said channel is provided with a plurality of internal ribs whereby said cover may be disposed at a plurality of selected distances from said dish.

References Cited by the Examiner

UNITED STATES PATENTS 2,490,873  12/1949  Johnson _____ 88—57
2,672,431   3/1954  Goetz _____ 195—103.5
2,910,915  11/1959  Harris _____ 88—96
3,001,748   9/1961  Austin.

FOREIGN PATENTS 936,299  12/1955  Germany.
  9,432  11/1913  Great Britain.

OTHER REFERENCES

85th Anniversary Catalogue, Laboratory Apparatus and Supplies, Eimer and Amend, New York, 1936, page 56.

JEWELL H. PEDERSEN, *Primary Examiner.*

MAURICE A. BRINDISI, *Examiner.*